June 26, 1934.  G. H. WATSON  1,964,235
BEER COIL CLEANER
Filed Jan. 22, 1934
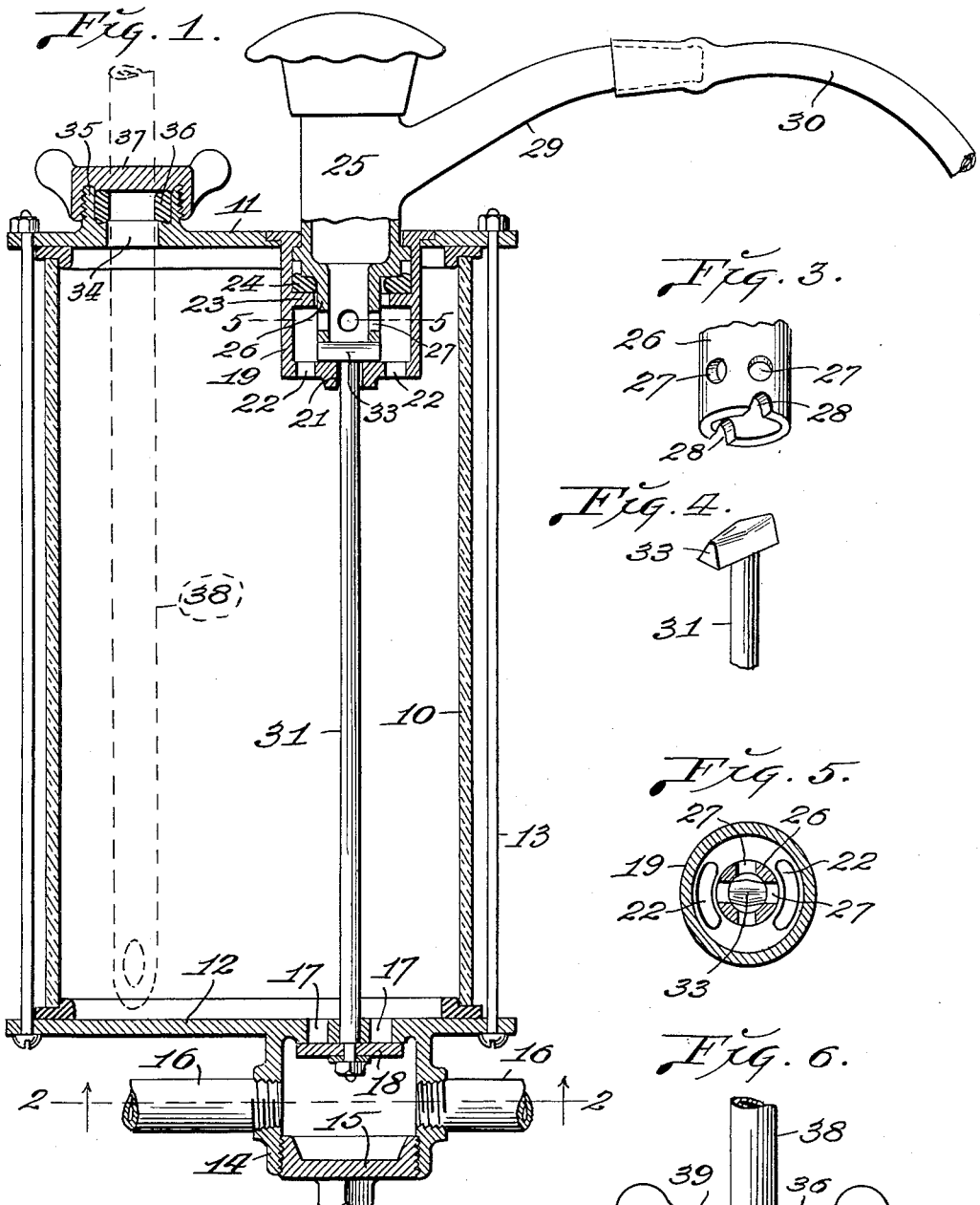
INVENTOR,
G. H. WATSON.
BY Martin P. Smith, ATTY.

Patented June 26, 1934

1,964,235

UNITED STATES PATENT OFFICE 1,964,235

BEER COIL CLEANER

George H. Watson, Los Angeles, Calif., assignor of one-half to Isidore Schwartz and one-half to Sarah L. Schwartz, both of Los Angeles, Calif.

Application January 22, 1934, Serial No. 707,667

7 Claims. (Cl. 225—12)

My invention relates to a beer coil cleaner and has for its principal object, the provision of a relatively simple, practical and inexpensive device that may be utilized for periodically cleaning and sterilizing the coils that are used for cooling beer as it is drawn from containers such as kegs or barrels.

Further objects of my invention are, to provide a beer coil cleaner that includes a container for a cleaning and sterilizing substance, said container having hot and cold water connections so that the cleaning and sterilizing substance may be forced through the beer cooling coils under pressure to thoroughly cleanse and sterilize the same and the flow of hot and cold water into and through the container being controlled by a valve that is actuated by the conventional fitting that forms a part of the beer cooling apparatus and which is removably inserted in the beer kegs or containers.

A further object of my invention is, to provide a beer coil cleaner that is adapted to receive the conventional form of tube that is inserted in the beer kegs or containers and which conveys the beer to the cooling coils.

With the foregoing and other objects in view my invention consists in certain novel features of construction and arrangements of parts that will be hereinafter more fully described and claimed and illustrated in the accompanying drawing in which:

Fig. 1 is a vertical section taken lengthwise through the center of a beer coil cleaner constructed in accordance with my invention.

Fig. 2 is a horizontal section taken on the line 2—2 of Fig. 1.

Fig. 3 is a detail perspective view of the lower end of the tubular fitting that is inserted in the upper portion of the cleaning device for engaging and operating the valve at the lower end of the cleaner.

Fig. 4 is a perspective view of the upper end of the valve stem or rod and which is engaged by the tubular fitting that is inserted in the top of the cleaner.

Fig. 5 is a horizontal section taken on the line 5—5 of Fig. 1.

Fig. 6 is a sectional view showing a collar that is screw-seated on a flanged outlet in the top of the cleaner when a conventional form of tube is inserted in the container of the cleaner for drawing off the contents thereof.

Referring by numerals to the accompanying drawing which illustrates a preferred embodiment of my invention, 10 designates a container preferably formed of glass and cylindrical in shape and the ends of this container are closed by an upper plate 11 and a lower plate 12, said plates being clamped on the ends of the container 10 by rods or elongated bolts 13.

Formed integral with the bottom plate 12 and depending therefrom, is a short tubular wall 14, the lower end of which is closed by a removable plug 15 and connected to said wall on opposite sides thereof, are pipes 16 that are connected respectively to sources of hot and cold water supply.

Formed through plate 12, above the chamber within the wall 14, are openings 17 and the flow of water upwardly through these openings is controlled by a gate valve 18 that lies immediately against the underside of plate 12 within the chamber of tubular wall 14.

Seated in the upper plate 11, directly above the openings 17, and extending downwardly into the chamber within container 10, is a short tubular fitting or bushing 19, the lower end of which is closed by a plate 20.

Formed through the center of this plate, is an opening 21 and formed through said plate to the sides of said opening, are openings 22.

Formed integral with the wall of the bushing 19, is an inwardly projecting flange 23, on top of which rests a packing ring or gasket 24.

Tubular member 19 is adapted to receive the lower portion of a fitting 25, that forms a part of the conventional apparatus for conveying beer from the kegs or containers to the cooling coils and which fitting is inserted in the conventional bung fitting of the beer keg or container.

This fitting 25 is provided with a short tubular terminal portion 26 having openings 27 formed in its wall and formed in the lower end of this tubular portion 26 are diametrically arranged notches 28.

Fitting 25 is provided with a laterally projecting tubular arm 29, to which is connected a flexible tube 30 and the latter leads to the coil of the beer cooling apparatus.

The lower end of a rod or valve stem 31 passes through plate 12 between the openings 17 and the lower end of said rod is connected to rod 18. The upper end of this stem or rod 31 extends through the opening 21 in the center of plate 20 and fixed to the upper end of said rod and arranged within the lower portion of the chamber in the bushing 19, is a short cross bar 33. This cross bar is adapted to occupy the notches 28 in the lower end of the fitting 25 when the latter is inserted in the bushing 19.

When fitting 25 is inserted in bushing 19 to engage the cross bar on the upper end of the valve stem, a shoulder on fitting 25 engages the packing ring or gasket 24 to form a fluid pressure tight joint between the bushing and fitting.

When fitting 25 is positioned in the bushing, it is retained therein by a conventional bayonet joint (not shown).

Formed through plate 11 to the side of the bushing 19, is an opening 34 surrounded by an externally threaded flange 35 and arranged within said flange is a packing ring or gasket 36.

When the conventional fitting 25 is applied to my improved beer coil cleaner, the opening 35 is closed by a cap 37 that is screwed onto the threaded flange 35.

Certain forms of beer drawing apparatus include a long tubular member such as 38 that is inserted in the kegs or barrels through the conventional bung bushing and in order that my improved cleaning device may accommodate this tube 38, the opening 34 is provided and when the tube is inserted through said opening, a collar such as 39 which encircles the tube 38, is screwed onto the threaded flange 35, and said collar comprises the packing ring or gasket 36 so as to provide a fluid pressure tight joint between the tube 38 and said threaded flange (see Fig. 6).

In the use of my improved beer coil cleaner, valve 18 is shifted into position to close the openings 17 and a suitable cleaning solution is delivered through bushing 19 to fill the container.

Opening 39 is closed by cap 13 and fitting 25 is now inserted in bushing 19 and manipulated so that the notches 28 engage the cross bar 33 on the upper end of valve stem 31.

Fitting 25 is now rotated approximately a quarter turn, which moves valve 18 into position so as to uncover the openings 17 and hot and cold water from pipes 16 now flows under pressure through openings 17 upwardly into the container to force the cleaning fluid contained therein out through openings 22 in the bottom of the bushing, thence through openings 27 into fitting 25 and the cleansing solution passes from said fitting through the flexible tube 30 to and through the coils of the beer cooling apparatus.

The flow of hot and cold water through the supply pipes 16 is controlled by suitably located valves (not shown).

After the cleansing and sterilizing operation has been completed, fitting 25 is partially rotated to close valve 18 and said fitting is then removed from the bushing and repositioned in the bung bushing of the beer keg or barrel.

When my improved cleaner is utilized in connection with beer drawing apparatus having a tube such as 38, a suitable plug shaped similarly to the lower portion of fitting 25 is inserted in bushing 19 and partially rotated to close valve 18, after which the container 10 is filled with the cleansing solution.

Cap 37 is removed and tube 38 is inserted through opening 34, as shown by dotted lines in Fig. 1 and collar 39 is screwed onto flange 35 to compass gasket 36 and form a tight joint between the flange and inserted tube.

The plug that is inserted in bushing 19 and which engages cross bar 33 on valve stem 31 is now rotated approximately a quarter turn to shift valve 18 and uncover openings 17 and the cleansing solution under pressure of the water flowing through pipes 16 will pass into and through tube 38 and flow from thence to and through the coils of the beer coil apparatus.

Thus it will be seen that I have provided a beer coil cleaner that is relatively simple in construction, inexpensive of manufacture and very effective in performing the functions for which it is intended.

An especially desirable feature of my invention is, the construction whereby the cleaner may be utilized in connection with the standard forms of apparatus utilized for drawing beer from kegs and barrels and conveying the same to the coils of the cooling apparatus.

It will be understood that minor changes in the size, form and construction of the various parts of my improved beer coil cleaner may be made and substituted for those herein shown and described without departing from the spirit of my invention, the scope of which is set forth in the appended claims.

I claim as my invention:

1. A beer coil cleaner, comprising a container, a water supply pipe connected to the lower portion of said container, a valve for controlling the flow of water from said supply pipe into and through said container, a stem secured to said valve and extending upwardly through said container, a bushing in the upper portion of said container, which bushing is adapted to receive a conventional form of fitting used for drawing beer from kegs and like containers and a head on the upper end of said valve stem, which head occupies said bushing and is adapted to be engaged by the conventional fitting when the latter is inserted in said bushing.

2. In a beer coil cleaner, a container, a fluid supply pipe connected to the lower portion of said container, a valve for controlling the flow of fluid from said supply pipe into and through the container, a bushing seated in the upper portion of said container, said bushing being provided with outlet ports, a stem projecting upwardly from said valve into said bushing and a head carried by the upper end of said valve stem and arranged within said bushing.

3. In a beer coil cleaner, a container, a fluid supply pipe connected to the lower portion of said container, a valve for controlling the flow of fluid from said supply pipe into and through the container, a bushing seated in the upper portion of said container, said bushing being provided with outlet ports, a stem projecting upwardly from said valve into said bushing, a head carried by the upper end of said valve stem and arranged within said bushing and a packing ring positioned within said bushing.

4. A beer coil cleaner, comprising a container, a water supply pipe connected to the lower portion of said container, a valve for controlling the flow of water from said supply pipe into and through said container, a stem secured to said valve and extending upwardly through said container, a bushing in the upper portion of said container, which bushing is adapted to receive a conventional form of fitting used for drawing beer from kegs and like containers, a head on the upper end of said valve stem, which head occupies said bushing and is adapted to be engaged by the conventional fitting when the latter is inserted in said bushing, there being an opening formed through the top of the container and a cap for normally closing said opening.

5. In a beer coil cleaner, a container, a fluid supply pipe connected to the lower portion of said container, a valve for controlling the flow of fluid from said supply pipe into and through the container, a bushing seated in the upper portion of said container, said bushing being provided with outlet ports, a stem projecting upwardly from said valve into said bushing, a head carried by the upper end of said valve stem and arranged within said bushing, there being an opening formed through the top of the container and a cap for normally closing said opening.

6. In a beer coil cleaner, a container, a bushing seated in the upper portion of said container, there being outlet openings formed in the lower portion of said bushing, a pair of fluid supply pipes connected to the lower portion of said container, ports in the lower portion of the container for permitting fluid from said supply pipes to enter said container, a valve normally closing said ports, a stem secured to said valve and projecting upwardly through the container into the lower portion of said bushing and a head on the upper end of said stem within said bushing.

7. In a beer coil cleaner, a container, a bushing seated in the upper portion of said container, there being outlet openings formed in the lower portion of said bushing, a pair of fluid supply pipes connected to the lower portion of said container, ports in the lower portion of the container for permitting fluid from said supply pipes to enter said container, a valve normally closing said ports, a stem secured to said valve and projecting upwardly through the container into the lower portion of said bushing, a head on the upper end of said stem within said bushing and a packing ring supported within said bushing above the outlet ports therein.

GEORGE H. WATSON.